United States Patent [19]

Kleid et al.

[11] Patent Number: 5,162,105
[45] Date of Patent: * Nov. 10, 1992

[54] PROCESSES TO RECOVER AND RECONCENTRATE GOLD FROM ITS ORES WITH MICROORGANISMS

[75] Inventors: Dennis G. Kleid, Foster City; William J. Kohr, San Mateo; Francis R. Thibodeau, San Francisco, all of Calif.

[73] Assignee: Geobiotics, Inc., Palo Alto, Calif.

[*] Notice: The portion of the term of this patent subsequent to Oct. 6, 2009 has been disclaimed.

[21] Appl. No.: 617,978

[22] Filed: Nov. 26, 1990

Related U.S. Application Data

[63] Continuation-in-part of Ser. No. 441,836, Nov. 27, 1989, abandoned.

[51] Int. Cl.$^5$ .............................................. C22B 11/00
[52] U.S. Cl. .............................. 423/29; 423/DIG. 17; 75/744
[58] Field of Search ...................... 75/744; 423/27, 29, 423/DIG. 17; 435/262, 168

[56] References Cited

U.S. PATENT DOCUMENTS

| | | | |
|---|---|---|---|
| 3,756,947 | 9/1973 | Fujii et al. | 210/903 |
| 4,256,705 | 3/1981 | Heinen et al. | 423/29 |
| 4,690,894 | 9/1987 | Brierley et al. | 435/244 |
| 4,729,788 | 3/1988 | Hutchins et al. | 75/118 |
| 4,769,223 | 9/1988 | Volesky et al. | 423/DIG. 17 |
| 4,789,481 | 12/1988 | Brierley et al. | 210/661 |
| 4,801,329 | 1/1989 | Clough et al. | 423/29 |
| 4,822,413 | 4/1989 | Pooley et al. | 423/29 |
| 5,021,088 | 6/1991 | Portier | 423/27 |

OTHER PUBLICATIONS

Anonymous, Mining Journal, vol. 273, Mar. 7, 1969, p. 204 "Bacteria Extract Gold".

Anonymous, Mining Journal, vol. 274, May 1, 1970, p. 394 "Gold Extraction Developments in the USSR".

Torma, A. E., "A Review of Gold Biohydrometallurgy", 8th Int. Biotech. Symp. (1988) pt. 2, pp. 1158–1168.

Shacklette, H. T. et al., Geological Survey Bulletin 1314 (U.S. Government Printing Office 1976).

Jones, R. C. Geological Survey Circular 625 (U.S. Government Printing Office 1970).

Smith, A. D. and Hunt, R. J., J. Chem. Tech. Biotechnol. 1985, 35 B, 110–116.

Castric, P. A., Cyanide in Biology, 233–261 (R. Vennesland et al. editors) Academic Press 1981.

Vennesland, B. et al., HCN Production by MicroAlgae, in Cyanide in Biology 349–361 (B. Vennesland et al. editors) Academic Press 1981.

Korobushkina, E. D. et al., Mikrobiologiya 43:49–54 (Engl. transl. p. 37–41).

Metallothionein II, Proceedings of the Second International Meeting on Metallothionein and Other Law Molecular Weight Metal Binding Proteins, Zurich, Aug. 21, 24, 1985 (Kasi, J. H. R. and Kojima, Y. ed.) Birkauser-Verlag.

Biotechnology For the Mining, Metal Refining and Fossil Fuel Processing Industries, May 28–30, 1985 Rensselear Polytechnic Institute, Troy, N.Y. (H. L. Ehrlich and D. S. Holmes, ed.).

Girling, C. A. et al., Economic Geology 74:902–907 (1979).

Hutchins, J. A., et al., Mining Engineering 40:249–254 (1988), April.

Hutchins, J. A., et al., Ann. Rev. Microbiol. 40:311–336 (1986).

Spisak, J. F., Biotech & Bioeng. Symp. No. 16,331 (John Wiley & Sons) 1986 Biotech. For the Mining, Metal Refining and Fossil Fuel Processing Indus., May 28–30, 1985 Rensselear Polytec. Inst., Troy, N.Y. (H. L. Ehrlich and D. S. Holmes, ed.).

Bruynesteyn, Biotech & Bioeng. Symp. No. 16, 351 (John Wiley & Sons) 1986.

Lakshmanan, V. I., Biotech. & Bioeng. Symp. No. 16,351, 1986 Biotech. For the Mining, Metal Refining and Fossil Fuel Processing Indus., May 28–30, 1985 Rensselear Polytec. Inst., Troy, N.Y. (H. L. Ehrlich and D. S. Holmes ed.).

Richmond, A., Algae Biomass 65–72 (G. Shelef & C. J. Soeder) 1980 Elsevier/North Holland Biomedical Press.

Persoone, G. et al., Algae Biomass, 505–522 (G. Shelef & C. J. Soeder, ed. 1980) Elsevier/North Holland Biomedical Press.

Brimer, L., Cyanide Compounds in Biology, 1988 Ciba Foundation Symposium 140, 177–196.

Benemann, J. R., et al., 4 Economic Microbiol. 177–206 (A. H. Rose ed. (1979) Academic Press.

Taub, F. B. Algae Biomass, 707–721 (G. Shelef and C. J. Soeder, ed. 1980) Elsevier/North Holland Biomedical Press.

Rodgers, P. B. et al., J. Gen. Microbiol. 108:261 (1978).

Endo, H. and Shirota, M., Proc. IV IFS: Ferment. Technol. Today, 533–541 (1972).

(List continued on next page.)

Primary Examiner—Michael Lewis
Assistant Examiner—Steven Bos
Attorney, Agent, or Firm—Lyon & Lyon

[57] ABSTRACT

A variety of processes for recovering gold from gold ore are disclosed. Briefly, the methods include culturing at least one microorganism species capable of producing cyanide ion under conditions wherein the microorganism produces cyanide ion, thus forming a cyanide ion-containing culture; contacting the cyanide ion-containing culture with gold ore, causing production of gold ion-cyanide ion complexes and biosorption of said complexes to said cultures; and recovering gold from the culture. The invention may be practiced with a variety of microorganisms, including Chromobacterium violaceum and Chlorella vulgaris.

32 Claims, No Drawings

OTHER PUBLICATIONS

Herbert, et al., *J. Gen. Microbiol.* 14:601 (1956).
Krauss, R., *Am. J. Botany* 49:425 (1962).
Pistorius, E. K. et al., *Planta (Berl.)* 128:73–80 (1976).
Mohn, F. H. Algae Biomass, 547–571 (G. Shelef and C. J. Soeder, ed. 1980) Elsevier/North Holland Biomedical Press.
Benemann, J. R. et al., *Algae Biomass,* 457–495 (G. Shelef and C. J. Soeder, ed. 1980) Elsevier/North Holland Biomedical Press.
Higham, D. P. et al., *J. Inorganic Biochem.* 28:253–261 (1986).
Knowles, C. J. Cyanide Compounds in Biology, 1988 Ciba Foundation Symposium 140:3–9.
Hughes, M. A. et al., 1988 Cyanide Compounds in Biology, Ciba Foundation Symposium 140 111–130.
Halkier, B. A. et al., 1988 Cyanide Compounds in Biology, Ciba Foundation Symposium 140 49–66.
Nazly, N. et al., in *Cyanide in Biology,* 289–299, (R. Vennesland et al. editors) Academic Press 1981.
Silver, S. and Misra, T. K. *Ann. Rev. Microbiol.* 1988 42:712–743.
Wall, C. et al. *Mining Magazine,* May 1987 393–401.
Hao, P. L. C. et al. *Proc. IV IFS: Ferment. Technol. Today* 509–512 (1972).
Tomizuka, N. and Takahara, Y. *Proc. IV IFS: Ferment. Technol. Today* 513–520 (1972).
Poulton, J. E., 1988 *Cyanide Compounds in Biology.* Ciba Foundation Symp. 140 67–91.
Nahrstedt, A. in *Cyanide in Biology,* 145, (R. Vennesland et al. ed.) Academic Press 1981.
Henry, M. F. in *Cyanide in Biology,* 415, (R. Vennesland et al. ed.) Academic Press 1981.
Seigler, D. S. in *Cyanide in Biology,* 133–143, "Cyanogenic Glycosides and Lipids: Structural Types and Distribution" (R. Vennesland et al. ed.) Academic Press 1981.
Conn, E. E. in *Cyanide in Biology,* 183 (R. Vennesland et al. ed.) Academic Press 1981.
Ogawa, T. and Terui, G., Proc. IV. IFS: *Ferment. Technol. Today* 543–549 (1972).
Rose, A. H., 4 *Economic Microbiology,* 1–29 (A. H. Rose ed.) Academic Press 1981.
Mohn, F. H., Algae Biomass 547–571 (G. Shelef and C. J. Soeder, ed. 1980) Elsevier/North Holland Biomedical Press.
Goldman, J. C., Algae Biomass, 343–359 (G. Shelef and C. J. Soeder, ed. 1980) Elsevier/North Holland Biomedical Press.
Shilo, M., Algae Biomass 385–388 (G. Shelef and C. J. Soeder, ed. 1980) Elsevier/North Holland Biomedical Press.
Abelovich, A., Algae Biomass 205–215 (G. Shelef and C. J. Soeder, ed. 1980) Elsevier/North Holland Biomedical Press.
Becker, E. W., et al, Algae Biomass, 35–50 (G. Shelef and C. J. Soeder, ed. 1980) Elsevier/North Holland Biomedical Press.
Karavko et al., The Bacterial Leaching of Metals and Iron Ores, 1977, *Technicopy Ltd.,* pp. 62–65.
Kuyucak, N. & Volesky, B., *Biorecovery* 1989, vol. 1, pp. 219–235.

PROCESSES TO RECOVER AND RECONCENTRATE GOLD FROM ITS ORES WITH MICROORGANISMS

This application is a continuation-in-part of Ser. No. 441,836 filed Nov. 27, 1989, now abandoned.

DESCRIPTION

1. Field of the Invention

The present invention is directed to highly advanced industrial processes to recover gold from its ores using a new combination process that includes (Au°) dissolution and oxidation to a gold ion-cyanide ion complex and subsequent or simultaneous biosorption of the dissolved gold complexes using certain microorganisms. The cyanide released by such microorganisms, which include algae, fungi and bacteria, is used to oxidize, dissolve and biosorp gold from metal ores or other media in a pollution free process. Thereafter, the dissolved gold may be selectively reclaimed in high yield.

2. Objects of the Invention

Gold is one of the rarest metals on earth. It occurs naturally as the reduced metal (Au°) or associated with quartz or pyrites as telluride ($AuTe_2$), petzite $(AuAg)_2Te$ or sylvanite $(AuAg)Te_2$. Most frequently gold is dispersed in low concentration throughout large volumes of material, usually rock. Gold deposits occur in belts across the earth's crust in various forms: placers or aluminum quartz veins in sedimentary or indigenous formation, blanket or pebble beds or conglomerates, or as base metal ore associations. Gold bearing veins are found in rocks of all compositions and geologic ages, deposited in cavities and associated with rocks such as slates or schists.

One object of this invention is to introduce novel methods for gold mining, which, unlike the methods used to date, do not pollute the air or water and are environmentally sound and safe. Another object of this invention is to increase gold production and the available domestic gold reserve. This invention achieves the latter object by both improving the economics of existing operations and making cost-effective the recovery of certain types of low grade material and generally surface minable material prevalent in the United States. The invention also may be used with carbon containing ores which are not processable with prior art methods. Each of these objectives will be explained below.

Methods for recovering gold from its ores (termed "beneficiation methods") are extremely expensive and labor and heavy machinery intensive. Gold is one of the least reactive metals on earth. It does not combine with oxygen or with nearly any other chemicals, no matter how corrosive. Gold does combine with cyanide, however, and all of the commonly used industrial methods for removing gold ores from rock require the use of cyanide which is highly toxic, hazardous to the environment and difficult to remove. Basically, the first step in all methods is to subject the ore to cyanide leaching followed by a gold recovery process. The three known methods for extracting gold from the cyanide leach solution are the "Merrill-Crowe" or zinc dust precipitation process, the carbon-in pulp process, and the carbon in-leach process. Other gold recovery processes use gravity methods to extract the high proportion of free gold and flotation-roasting leaching to extract the remaining gold.

Cyanide and cyanide by-products from cyanide leaching operations are responsible for several environmental impacts, including air and water pollution and solid waste disposal contamination. Free cyanide and various cyanide complexes are the by products of current leaching methods. Although cyanide will degrade, for example in a surface stream exposed to ultraviolet light, aeration and complexing with various chemicals present in the stream water, in-stream degradation is a wholly unsatisfactory approach to removing cyanide from the environment. Cyanide solutions are often kept in open ponds and frequently birds or other animals are exposed and killed by the toxic material.

Air pollution with cyanide also is an unavoidable result of prior art methods for heapleaching of gold. Cyanide solutions are sprayed onto the heaps. The cyanide drifts and contaminates the surrounding environment. The air releases of cyanide instantaneously and adversely impact wildlife and vegetation. As is the case with cyanide released into water, eventually the cyanide is degraded by ultraviolet light, but not until after it has adversely affected the environment. The EPA directs considerable efforts and expense in regulating cyanide releases into the air and water. Chronic cyanide toxicity due to long-term exposures to low levels is also a health factor to be considered and, the effects such exposures are not presently well known. For these reasons there has been a long standing need for gold mining processes which do not pollute the environment with cyanide and cyanide by-products. This invention creates much lower levels of cyanide ion and the ion is produced in the presence of microorganisms which are capable of rapidly and efficiently metabolizing it.

The most common methods for treating and destroying residual cyanide from heapleaching involve chemical treatments, including for example, alkali chlorination or other means of oxidizing cyanide to its intermediate or end constituents. These methods produce unstable cyanide complexes which gradually break down to produce residual free cyanide. For these reasons, the methods are inadequate from an environmental impact standpoint.

The present invention is a breakthrough in gold mining technology which eliminates substantial environmental problems extant with the current technology. The present invention uses bacteria and algae and biotechnological methods to dissolve the gold. After biosorption, the gold is recovered from its ores, again without releasing harmful cyanide or cyanide by-products into the environment.

As previously mentioned, another object of this invention is to increase gold production and the domestic gold reserves. The demand for gold is causing the rapid depletion of worldwide reserves. It has been estimated that most high grade ore reserves will be depleted within the next 10–50 years. Another problem for the United States is that many strategic metals, including gold, are vulnerable to embargoes. It would be very desirable for the U.S. to increase its domestic gold reserves by mining available low grade ores. Furthermore, much of the gold mined in the U.S. is exported to Korea and Japan for refining, processing and finishing. This is an undesirable balance of trade: like an underdeveloped country, the U.S. is exporting raw material resources and importing finished goods and gold ready for industrial applications. As a result, the United States consumes more gold than it produces. One of the reasons it is expensive to mine and refine gold in the U.S. is the cost of environmental protection. As will be explained below, the present invention solves all of these problems.

There are four types of gold deposits: placer deposits, lode deposits, blanket (or reef-type) deposits and disseminated deposits. Placer deposits are flat-laying deposits composed of unconsolidated materials, such as gravel and sands, in which the gold particles occur as free particles ranging in size from nuggets to fine flakes. They are the result of erosion and transport of rock. Placer deposits most commonly are mined using water based surface methods, including hydraulicking, dredging and open pit mining. These deposits usually are not mined in underground operations.

Lode deposits, by contrast consist of gold particles contained in quartz veins or country rock. Lode deposits usually are mined in deep underground mines using a variety of methods, although sometimes lode deposits are surface mined.

The blanket or reef-type deposits are deposits in which the gold exists in quartz conglomerates. Such deposits have resulted from the consolidation of placer deposits. These types of deposits are mined exclusively using underground mining techniques.

Disseminated gold deposits have three identifying characteristics. The gold mineralization is fairly evenly distributed throughout the deposit rather than being concentrated in veins (as in lode deposits) or in paystreaks (as in placer deposits); the deposits consist of in place materials rather than transported materials; and the disseminated deposits are less flat. Generally, these types of deposits are mined using surface mining techniques.

Nearly all of the world's gold production has come from mining reef-type or placer type deposits in the past. The Witwaterstrand and Orange Free State deposits in the Republic of Africa, the richest gold deposits in the world, are reef-type deposits. The mining in the United States and Australia by comparison, is now predominantly mining disseminated deposits. This type of gold mining is a relatively recent development, having begun in 1965. An estimated 75% of the recoverable gold in the United States is composed of surface minable material and an estimated 25% of the recoverable Australian gold is surface minable. By contrast, the greatest percentages of gold in the Republic of South Africa and Canada are contained in deep deposits which must be mined in large, underground operations. In addition to the surface minable gold, there are large bodies of gold ore currently are unminable in the United States because of problems with the current technology. This invention is most useful for in situ and with surface minable ore, although the invention also is useful with gold ore that has been pulverized and put into tanks. The present invention makes surface mining of gold easier and more cost effective, thereby increasing the domestic gold reserve. By greatly reducing the costs of mining gold and by eliminating the environmental problems with the current technology, it now becomes more attractive and feasible to refine and finish gold domestically.

DESCRIPTION OF THE PRIOR ART

Certain types of microorganisms, including algae, bacteria and fungi and even some higher plants are known to selectively accumulate gold if it is available in the water or soil, although not in amounts that heretofore would be profitable to extract for the metal value.

See generally Shacklette, H. T., Lakin, H. W., Hubert, A. E., and Curtin, G. C. *Absorption of Gold by Plants*, Geological Survey Bulletin 1314 (U.S. Government Printing Office 1976); Jones, R. C. *Gold Content of Water, Plants and Animals*, Geological Survey Circular 625 (U.S. Government Printing Office, 1970). Certain bacteria and algae, for example, are known to be cyanogenic. Castric, P. A. The *Metabolism of HCN by Bacteria*, 233-261 in Cyanide in Biology (B. Vennesland et al. ed.) Academic Press 1981; Smith, A. D. and Hunt, R. J., *Solubilization of Gold by Chromobacterium violaceum, J. Chem. Tech. Biotechnol.*1985, 35B, 110-116; Vennesland, B., Pistorius, E. K. Gewitz, H. S., *HCN Production By MicroAlgae* 349-361 in Cyanide in Biology (B. Vennesland et al. ed.) Academic Press 1981. Since the early 1900's scientists postulated that plants had a major role in the deposition of gold throughout geological time.

The biological method for dissolving gold may involve one or more poorly defined processes. Some authors have tried to understand these processes, with little success. See e.g., Korobushkina, E. D., Chernyak, A. S., and Mineev, G. G., *Dissolution of Gold by Microorganisms and Products of Their Metabolism, Mikrobiologiya* 43:49-54 (Engl. transl. p. 37-41).

It has been postulated that certain proteins in the microorganisms (known as metallothioneins) may be responsible for gold concentration and uptake. The first metallothionein was discovered in the early 1980's in horse kidney cortex. It bound zinc, copper and cadmium and was characterized by a molecular weight under 6000, an unusually high cysteine content and a large number of metal-thiolate bonds. Since then, related proteins have been isolated in nearly every variety of organism tested. Metallothioneins currently known selectively bind zinc, copper, lead, nickel, tin, cadmium, copper, bismuth, mercury, silver, and gold. Depending on their particular structure, the metallothioneins can be extremely selective. In nature, this means that the one metal will be accumulated to the nearly complete exclusion of the other. In 1986, a medical research team investigating antiarthritic drugs reported the discovery of a metallothionein capable of selectively concentrating gold. See generally, Metallothionein II Proceedings of the Second International Meeting on Metallothionein and other Low Molecular Weight Metal-Binding Proteins, Zurich, August 21-24, 1985 (Kagi, J. H. R. and Kojima, Y., ed.) reprinted in EXS Experientia Supplementum Vol. 52.

To date, no one has developed a process for using cyanide-producing microorganisms or metallothioneins for gold mining, or for that matter, as mineral processing tools. The use of microorganisms or plants in the field of gold mining has been limited. See generally, Biotechnology For the Mining, Metal Refining and Fossil Fuel Processing Industries, May 28-30, 1985 Rensselear Polytechnic Institute of Troy, N.Y. (H. L. Enrlich and D. S. Holmes ed.). Plants have been used as geobotanical indicators of gold. Girling, C. A., Peterson, P. J. and Warren, H. V., *Plants as Indicators of Gold Mineralization at Watson Bar, British Columbia, Canada, Economic Geology* 74:902-907 (1979). Microorganisms also have been used in the pretreatment processes, including leaching and pretreatment of refractory sulfide ores. In bioleaching, microorganisms are used prior to cyanidation to break down arsenopyrite and pyrite within the ore. When present, these compounds occlude the gold thereby decreasing recoverable yield. See, e.g., U.S. Pat. Nos. 4,690,894 and 4,789,481 to Brierley et al., U.S. Pat. No. 4,729,788 to Hutchins et al., Hutchins, J. A., Brierley, J. A., and Brierley, C. L., *Microbial Pretreatment of Refractory Sulfide and Carbonaceous Ores Improves the Economics of Gold Recovery, Mining Engineering* 40:249-254 (1988); Hutchins, S. R., Davidson, M. S., Brierley, J. A., and Brierley, C. L., *Microorganisms In Reclamation of Metals, Ann. Rev. Microbiol.* 40:311-36 (1986). Microorganisms also have been used in the treatment of mine effluents for removal of residual cyanide. Such microorganisms are known to take up gold and in some instances are thrown into the gold ore for hopeful recovery by the usual methods.

Nonliving biomass also has been discussed for use in biosorption technologies. It has been postulated that biosorption may be applied to metal recovery and industrial work treatment. The industrial application of biotechnology to large scale gold mining operations is entirely novel. This invention represents the first time microorganisms have been employed directly to solubilize and recover gold for mining.

Indeed, industry specialists have opined that organisms are too fragile, exhibiting poor kinetics, extremely limited in utility in the harsh outdoor and metallurgical processing environments common in the industry. Spisak, J. F., *Biotechnology and the Extractive Metallurgical Industries: Perspectives for Success*, Biotech. and Bioeng. Symp. No. 16, 331 (John Wiley & Sons 1986); Lakshmanan, V. I., *Industrial Views and Applications: Advantages and Limitations of Biotechnology*, Biotech. and Bioeng. Symp. No. 16, 351 (John Wiley & Sons 1986). Others have opined that organisms will prove useful only in limited pre-treatment applications such as leaching and that biosorption is not presently feasible for industrial applications. Bruynesteyn, Biotech and Bioeng. Symp. No. 16 (John Wiley & Sons 1986).

In traditional mills, gold that has been dissolved from a large volume of ore with cyanide is passed through activated charcoal. The carbon in the charcoal has an affinity for the hydrophobic gold cyanide compounds and removes them from solution. The concentrated gold is later washed from the charcoal for final processing. However, if the ore naturally contains carbonaceous material, the charcoal will be unable to bind the gold in preference to the carbon in the ore. Instead, the native carbon competes successfully against the activated charcoal as a binding agent. As a result, the dissolved gold will not be removed from the general ore mass and concentrated on the charcoal. Such ores are described as "preg robbing" because they rob the metal from the solution pregnant with gold cyanide. In such cases, the ore requires expensive pretreatment, if it can be processed economically at all.

This invention provides a biological alternative that has the same end result as pretreatment, but at a significantly lower cost. It uses organisms that produce gene products having a much higher metal ion binding affinity than the current charcoal technology. As a result, pretreatment will not be necessary. The organisms will successfully perform the task in carbonaceous ore that activated carbon can only perform in ores without carbon.

Nearly 40% of the known gold resources in the United States cannot be processed without major additional expense using any known technology because of carbon contamination. In the trade, these ores are described as "refractory."

Alternative Treatment Methods for Carbonaceous Ores

At present, there are fundamentally six possible treatment methods for "refractory" ores, although not all of them are useful for treating carbon problems. Roasting and chlorination are the two methods that are most developed and applicable for treating carbon-bearing ores. The others may play some role in the future or are often confused with methods for processing carbonaceous ores even within the mining industry.

1. Roasting. This is the method used in all of the most recent pretreatment plants. In Nevada four roasters have been put into operation since 1986, and at least one more in the planning stage.

Modern roasters use a fluidized bed construction and conventional fuel sources to heat the ores to about 700 degrees. The roasted ore is then quenched after being separated from dust and off-gasses. Following quenching, the oxidized ore can be processed using traditional cyanide/activated carbon extraction methods.

For any particular ore composition, these plants operate in a narrow range of tolerances. Below optimum temperature the carbon in the ore remains actively "preg robbing". Above the optimum, the rock becomes increasingly less porous and cannot be cyanided successfully in later stages to remove the gold from it. As a result, roaster efficiency in an operating environment tends to vary widely with variation in the feed ore.

Roaster costs are driven in large part by two factors: energy economics and environmental regulation. Energy sources are used for both heating and process control such as oxygen injection. As a result, this method is particularly sensitive to fluctuations in fuel prices. Environmental regulation is also a large and growing cost factor in the operation of roasters. The off-gas must be passed through an electrostatic precipitator to remove dust, then scrubbed to remove extremely toxic mercury and arsenic compounds and sulfur dioxide. As emission standards become stricter, process costs increase dramatically. Almost without exception, both analytical studies and actual operators estimate the cost of roasting to be in the area of $25 per ton of ore, although one source claims an estimate for a proposed plant of $8 per ton.

2. Chlorination. This was the method most favored until process economics and environmental regulation tipped the decision in favor of roasting. At least two chlorination plants were operating recently, although one of them may already be off-line.

In this process, the ore is ground and mixed with water to form a slurry. Chlorine gas is pumped into the slurry under pressure at a rate of about 60 to 120 lbs/ton, depending on residence time, organic carbon concentration in the ore and percent solids in the slurry. The chlorine gas will oxidize the carbon in the ore, rendering it less "preg robbing." After treatment, the hypochlorous acid generated must be treated with a reducing agent to prevent it from destroying the cyanide used later in the process.

This process is particularly sensitive to the amount of sulfide in the ore, since sulfur is oxidized before carbon. Higher sulfide ores require much more chlorine gas. Environmental factors also play a large part in driving costs. Gas emissions from the tanks must be captured by alkaline scrubbers before being released to remove the 10% chlorine they contain. High pressure chlorine gas is extremely dangerous.

Finally, the process is difficult to control in operation, and plants suffer from the corrosive gas. As a result of all of these factors, roasting will be the economically favored alternative for the foreseeable future.

3. Elextrooxidation. This technique is a variant of chlorination in which salt is added to the slurry and is then decomposed electrolytically to produce sodium and chlorine gas. The chlorine is then used in the same manner as in (2) above. However, unless there is a radical decrease in energy costs, this method will remain even less economically attractive than chlorination.

4. Pressure autoclaving. This method is far more successful at destroying sulfidic materials that make the ore refractory than it is at destroying preg robbing carbon that may be present. It is mentioned here for the sake of completeness.

5. Blanking Agents. There has been some experimentation with a proprietary blanking agent described in the literature. While no details of its composition or mode of action have been given, the name suggests that it acts by masking the active carbon sites so that they do not bind gold cyanide complex. In the past, kerosene has been tried as a blanking agent with poor results. Research results reported do not raise recovery to economic levels for blanking, and the researchers continue to search for a more effective treatment.

6. Oxidation with Base Metals. A chemical method of oxidizing carbon using base metals and chemical oxidants has been issued a patent. It does not appear to be an economical alternative in practice, and has not been adopted by any of the major mining companies.

A typical roasting and cyanidation plant operates as follows. The ore is first ground to a fine dust, concentrated to remove unproductive rock volume, roasted and quenched (carbon deactivation), slurried with water to about 50% solids and then treated with cyanide. Finally, the gold cyanide is adsorbed on activated carbon. While this is a logical order for these processes, an important point to note is that carbon deactivation does not need to precede cyanidation. The carbon interferes with removal of gold cyanide complex from process slurries, not dissolving of the gold.

The process begins with the same grinding and concentrating steps as roasting. Following concentration, the ore is combined with a living biological agent in an aqueous slurry at a concentration of 0.01% biomass. The slurry is then treated with cyanide. The biological agent has an affinity for the gold cyanide complex several orders of magnitude greater than the native carbon. As a result, it will interfere with and nearly totally outcompete the "preg robbing" (carbon binding) qualities of the ore itself.

The next step in the process will be recovery of the biomass-gold complex from the slurry by flotation. The agent can be dried to a tiny fraction of the initial ore weight (ca 0.4 lbs/ton of ore), and will contain ca. 1-2% gold. This concentration level is well within the parameters of biological heavy metal recovery reported in the literature. Finally, the dried biomass will be ashed and the gold recovered.

The process of this invention and a roasting mill differ in the ways shown below:

A) Process of this Invention

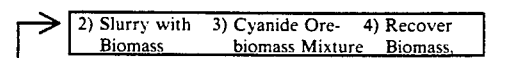

1) Grind, Concentrate

B) Conventional Treatment

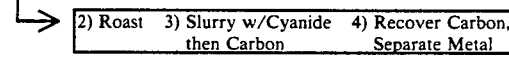

SUMMARY OF THE INVENTION

This invention teaches novel processes for recovering gold from gold ore using microorganisms. Broadly stated, the first step is to culture a microorganism capable of producing cyanide ion under conditions wherein the microorganism produces cyanide ion, thus forming a cyanide ion containing culture solution. Then the cyanide ion containing culture solution is brought into contact with gold ore, causing production of gold ion-cyanide ion complexes often as gold (I) ion, $[Au^+][CN^-]_2$ and biosorption of the complexes into the culture. It is also possible to induce the production of cyanide ion only upon interaction with the ore. By the method taught in this invention cyanide production by microorganisms may be controlled so as to maximize recovery. The gold ore may be a heap or an in situ blasted pieces of rock. Preferably the ore body will be crushed, milled or pulverized and either treated in a tank or piled in heaps; however, the invention has application in deep mines as well. Generally, ore grades of 0.02 oz/ton or greater may be treated using these methods. Finally, the gold may be recovered from the culture. In one embodiment, the gold-containing microorganisms may be separated from culture to form a sludge layer, which may, for example settle at the bottom or float to the top of a settling pond for harvesting.

Algal species which may be used to practice this invention include *Chlorella vulgaris, Cyanophora paradoxa* and *Cyanidium caldarium* or Blue-Green Cyanobacterium *Anacystis nidulans*. Likewise, the following strains of bacteria are prolifically cyanogenic and may be used: *Chromobacterium violaceum; Chromobacterium flavum; Bacillus pyocyaneus; Bacillus flourescens; Bacillus violaceous; Bacillus megaterium; Bacillus mesentericus; Bacterium nitrificans; Pseudomonas aeruginosa; Pseudomonas fluorescens; Pseudomonas aureofaciens; Pseudomonas cyanogena; Pseudomonas liquefaciens;* and *Pseudomonas cepacia*. Certain fungi are known to produce large amounts of cyanide ion, particularly basidiomycetes and ascomycetes. *Marasmius oreades* (which causes fairy ring disease) and the snow mould basidiomycete may be used in this invention, as well as members of the Fusarium species.

DEFINITIONS

The following terms, as used in this disclosure and claims, are defined as follows:

microorganism: a single celled microbe capable of self-replication including most algae, bacteria and some fungi.

algae: either a single species or a population visible as a green or blue-green slime. Blue-green algae are known as cyanobacteria and/or photosynthetic bacteria.

fungi: either a single fungal species or a fungal growth consisting of more than one species.

culture: aqueous solution comprising one or more species of reproducing microorganisms.

metallothionein: any polypeptide having several of the following characteristics: a molecular weight between 6000–7000; high metal content; an amino acid sequence characterized by high cysteine content and the absence of aromatic amino acids; unique distribution of cysteine residues in the amino acid sequences; spectroscopic features characteristic of metal-thiolate complexes and metal thiolate clusters.

biosorption: the absorption and/or adsorption of metal ions and/or metal ion complexes to a surface of a microbe or other membrane of natural origin, including the following means: particulate ingestion or entrapment by flagellae or extracellular filaments, active transport of ions, ion exchange, complexation, adsorption and inorganic precipitation, may also include subsequent reduction of metal ions to a metallic reduced state, and degradation of cyanide ion.

adsorption: non-specific binding of metal or metal ion to a surface.

in situ: a method of metal recovery involving the fragmentation of ore by, for example, underground blasting, and recovery of metal value from the ore without removal of the ore from the native location.

tank process: a method of metal recovery involving the extraction of gold from ore after the ore has been pulverized and is being held in a tank.

inducer: any organic compound, metal compound, ion or anion which is capable of inducing the pathway or pathways that produce a desired product, for example, cyanide ion. Examples of inducers include phosphate acetate, glycosides, amino acid precursors in the applicable cyanogenic pathway, iron, cobalt, copper, manganese, zinc, tryptophan and methionine.

gold ion-cyanide ion complex: examples are:

$$[Au^+][CN^-]_2, [Au^{+3}]_2[CN^-]_6, [Au^{+2}][CN^-]_2.$$

gold ore: any rock, stone or debris containing gold in a concentration or condition that is economically recoverable. In general an ore suitable for economic recovery must be at least 0.01 oz/ton.

The Biochemistry of Cyanogenesis

The process of cyanogenesis is thought to be the same in the microorganisms listed above. Cyanide is produced by oxidative decarboxylation of glycine in a process which is stimulated by methionine or other methyl-group donors. The reaction is $$NH_2CH_2COOH \rightarrow HCN + CO_2 + 4[H].$$

Cyanogenesis usually occurs in microorganisms at the end of the growth phase and it is affected by the iron and phosphate content of the medium. These factors suggest cyanogenesis is a secondary metabolism. Two likely mechanisms for cyanogenesis in bacteria, fungi and algae are discussed in *Knowles, C. J., Cyanide Utilization and Degradation by Microorganism,* 1988 Ciba Foundation Symposium 140 *Cyanide Compounds in Biology* 3–9 (hereby incorporated by reference). The first mechanism is the amino acid oxidase/peroxidase system. When extracts of *Chlorella vulgaris* are grown in the presence of oxygen, manganese ions and peroxidase, several amino acids, notably D-histidine, act as substrates for cyanogenesis. A soluble flavoprotein amino and oxidase and a particulate protein (probably with a peroxidase activity) are involved. The amine intermediate formed by the action of the amino acid oxidase is believed to react with hydrogen peroxide and oxygen in the presence of peroxidase to give an aldehyde and cyanide.

The second mechanism is the glyoxylic acid system. *Chlorella vulgaris* has a second system for producing cyanide from glyoxylate and hydroxylamine involving nonenzymatic formation of the oxime of glyoxylate followed by enzymic cyanide release:

$$\begin{array}{c}CHO\\CO_2H\end{array} + NH_2OH \longrightarrow \begin{array}{c}HC=NOH\\CO_2H\end{array} \longrightarrow HCN + CO_2$$

This reaction is stimulated by ADP and $Mn^{2+}$ and is thought to be part of the regulatory process for nitrate assimilation because nitrate reductase activity is reversible and highly sensitive to cyanide. The mechanism of cyanogenesis from glyoxylate may be related to cyanogenesis by bacteria and fungi from glycine, since glyoxylate oxime may be an intermediate in the later process. Furthermore, oxides are known intermediates in the conversion of amino acids to cyanogenic glycosides by plants. Microorganisms may use cyanide as a source of carbon or nitrogen. A strain of *Pseudomonas fluorescens* has been isolated which uses cyanide as a nitrogen source for growth when glucose is supplied as a carbon and energy source. Because cyanide (KCN or NaCN) is toxic to growth, the cultures should be grown in cyanide (KCN)-limited fedbatch or continuous culture. Cyanide may be supplied directly to the medium provided it is complexed, e.g., as nickel cyanide, $Ni(CN)_2^{2-}$. It is not known whether the bacterium acted on the very small amount of residual free cyanide, thereby displacing the free/complexed cyanide equilibrium, or whether it acted to release cyanide from the metal complex.

A high-speed supernatant fraction of the *Pseudomonas fluorescens* strain released ammonia from cyanide with the following stoichiometry;

$$NADH + H^+ + O_2 + HCN \rightarrow AND^+ + CO_2 + NH_3$$

At least two different proteins are involved, both of which are inducible by cyanide and repressed by ammonia. At least two mechanisms are possible: (a) a dioxygenase reaction according to the above equation; or (b) monooxygenase plus cyanate hydrolase (cyanase) activity.

$$NADH + H^+ + O_2 + HCN \rightarrow HCNO + H_2O + NAD+$$

$$HCNO + H_2O \rightarrow CO_2 + NH_3$$

Other routes for the assimilation of cyanide as a source of carbon and/or nitrogen by microorganisms may be postulated. For example:

(a) via formation of β-cyanoalanine and aspartate: HCN+cysteine→β-cyanoalanine→aspartate+NH$_3$ using β-cyanoalanine synthase and either a nitrilase or a nitrile hydratase with an amidase. The ammonia released could then be assimilated by conventional routes. Chain extension (one-carbon unit) of cysteine to aspartate also occurs and a cyclic series of steps could occur resulting in carbon assimilation.

(b) via formation of mandelonitrile (benzaldehyde cyanohydrin) by mandelonitrile lyase:

benzaldehyde + HCN → mandelonitrile.

The mandelonitrile could then be acted upon by a nitrilase (or a nitrile hydratase and an amidase) to release ammonia, which could be assimilated. Formation and further metabolism of a range of other cyanohydrins from their parent keto compounds is also possible.

(c) via formation of ammonia by either a cyanidase or a cyanide hydratase and a formamidase.

(d) via formation of thiocyanate by the action of rhodanese (thiosulphate sulphurtransferase):

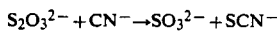

$$S_2O_3^{2-} + CN^- \rightarrow SO_3^{2-} + SCN^-$$

followed by release of ammonia from the thiocyanate.

As expected, the biochemistry of cyanogenesis involves cyanogenic glycosides and cyanolipids. These compounds are derivative of alpha-hydroxynitrilies (cyanohydrins). In the biochemical reactions involved, cyanogenic glycosides give off hydrogen cyanide and a carbonyl compound when the sugar moiety is removed. Similarly, cyanolipids give off hydrogen cyanide and a carbonyl compound when the fatty acid moiety is removed.

Cyanogenic glycosides are known to occur in over two thousand species of plants, including ferns, gymnosperms, angiosperms, fungi and bacteria. The highest concentrations of cyanogenic glycosides usually are found in the leaves. To date, the cyanogenic glycosides studied are believed to be derived from the five hydrophobic protein amino acids, L-valine, L-isoleucine, L-leucine, L-phenylalanine and L-tyrosine, and to a single non-protein amino acid cyclopentenyglycine. See generally, Halkier, B. A., et al. *Cyanogenic glucosides: the Biosynthetic Pathway and the Enzyme System Involved,* 1988 Cyanide Compounds in Biology, Ciba Foundation 140 49–91 hereby incorporated by reference.

Cyanolipids, on the other hand, occur most frequently in the seed oils of sapindaceous plants. The cyanolipids studied to date all are derived from L-leucine. Cyanogens have been detected in approximately thirty species of fungi, all basidiomycetes from five families, the Agaricaceae, Cortinariaceae, Polyporaceae, Rhodophyllaceae and the Tricholomataceae. The cyanogens studied in fungi to date all have been cyanohydrins of pyruvic acid and glyoxylic acid. The properties of cyanogenic glycosides include that they are not particularly stable and they are rather polar, therefore methanol and ethanol are good solvents for them.

The metabolic precursor of cyanide in bacteria is glycine. In fact, the only source of hydrogen cyanide in microorganisms appears to be glycine. Cyanide production in bacteria is enhanced by glycine: hydrogen cyanide production is stimulated when *Chromobacterium violaceum* is grown on a glutamate salts medium containing L-threonine. This organism may have an enzyme capable of converting L-threonine to glycine. The origin of the cyanide carbon in *Chromobacterium violaceum* is the methylene group of glycine. A possible explanation for this has been suggested in Knowles, C. J. (*Cyanide Utilization and Degradation By Microorganisms,* 1988 Cyanide Compounds in Biology, Ciba Foundation Symposium 140 3–9.

Microorganisms have a problem in terms of the supply of $C_1$ compounds for metabolism. They may obtain the $C_1$ compounds from either the conversion of serine to glycine with the transfer of the $C_1$ methylene group to tetrahydrofolate, and/or the conversion of glycine to $CO_2$ by a glycine synthase (which also requires tetrahydrofolate). However, bacteria require glycine for growth as well as for the production of $C_1$ units linked to the tetrahydrofolate pool. At the end of growth there might be a greater reduction in demand for $C_1$ compounds than for glycine or serine. If this were the case, the bacteria would need to get rid of excess glycine without an extra supply of $C_1$ compounds, which would occur when there is cyanogenesis. It is at the end of growth the cyanogenesis is observed. Furthermore, it is interesting that one of the primary acceptors for the methyl $C_1$ compounds is methionine which is a stimulator of cyanogenesis. Also cysteine is produced, because serine is converted into O-acetylserine and cysteine. In this complex sequence of events it could be that the only way to dump the excess glycine is to form cyanide, which would then build up as a toxic compound. Perhaps, when the glycine/$C_1$ crisis has been overcome, balance is restored by linking the potentially toxic cyanide to the cysteine to form non-toxic β-cyanoalanine.

Cyanogenesis in fungi is metabolically similar in many respects to hydrogen cyanide production in bacteria. The metabolic precursor of hydrogen cyanide in the snowmold basidiomycete is glycine where the methylene carbon and amino nitrogen are converted to cyanide carbon in nitrogen. Although the precursor of HCN in bacteria and fungi is well known, neither the metabolic pathways involved nor the nature of the cyanogenic enzyme system is well understood.

In practicing this invention, the above-mentioned species may be grown in the presence of added glycine in order to maximize cyanogenesis. Glycine is a known substrate for bacterial cyanide production.

The regulation of hydrogen cyanide synthase may be used as an element of control in practicing this invention. After the bacteria or algae is grown to a sufficient density, for example, 1 OD, the microorganism may be induced to produce cyanide ion by controlling hydrogen cyanide synthase production. Although glycine might be expected to be an inducer of enzyme production, the omission of this amino acid sometimes results in a slight increase in the specific activity of HCN synthase rather than a decline. Even so, intracellular glycine increases under these conditions and accounts for over one-third of the non-carbon source amino acid pool. These levels may be high enough to cause induction. In *Chromobacterium violaceum* the addition of small amounts of glycine to a glutamate-methionine salts medium actually partially suppresses hydrogen cyanide production, although higher amounts enhance cyanogenesis. The role of glycine in the regulation of hydrogen cyanide synthase biosynthesis is not well understood. Glycine may be taking part in the maintenance of stability of the enzyme during cyanogenesis. This could be used to promote hydrogen cyanide biosynthesis. The hydrogen cyanide synthase of *Pseudomonas aeruginosa* is extremely sensitive to aerobic conditions and is only present in significant amounts when cultural oxygen levels are low. The fact that glycine protects against this oxygen mediated inactivation in vitro suggest that it may also have this function in vivo.

Since glycine is known to have a positive affect on hydrogen cyanide synthase production, a microorganism capable of producing large amounts of glycine may be added and co-cultured with the cyanide in producing microorganisms in the culture pond. A particularly preferred method would be to incorporate a bacteria that produces glycine and which absorbs gold ion-cyanide ion complexes into a culture pond containing algae that produces cyanide by a pathway responsive to glycine induction. One skilled in the fermentation arts will be able to manipulate growth conditions of the co-habiting microorganisms to maximize the efficiency of the claimed process for recovering gold from gold ore.

Another amino acid that could be added to the medium to maximize cyanogenesis in bacteria is methionine. Although methionine cannot replace glycine in the stimulation of cyanogenesis it significantly enhances the amounts of cyanide produced. Methionine may function as a methyl group donor and, in so doing may indirectly influence hydrogen cyanide biosynthesis. Alternatively, methionine may influence apparent cyanide levels by inhibiting the assimilation, but not the production, of hydrogen cyanide. Methionine may even act as either an inducer of synthesis of hydrogen cyanide synthase or a positive affector of this enzyme. Induction of cyanogenesis by methionine in *Chromobacterium violaceum* has been suggested. In *Pseudomonas aeruginosa* this is probably not the case because exogenous methionine is not required for maximal hydrogen cyanide synthase activity. Moveover, in the absence of added methionine the intracellular levels of methionine never rise above a basal level during the culture cycle.

As was with the case with glycine, once methionine is shown in the lab or in a natural environment to enhance cyanogenesis in the selected microorganism or combination of microorganisms, this invention may be practiced by combining high methionine producing bacteria with either a single microorganism or a combination of microorganisms capable of solubilizing and adsorbing gold from gold ion-cyanide ion complexes.

L-glutamate is known to be a good carbon energy source for growing bacteria for cyanogenesis. Substituting glucose for this amino acid with *Chromobacterium violaceum* results in a slight increase in total cyanide produced. By the same token, using either a glucose-urea or a glucose-ammonia medium results in very little cyanide production and low levels of hydrogen cyanide synthase. Sources of glutamate may be biological or chemical.

Studies in *Chromobacterium violaceum* confirm that the presence of glycine, methionine, tryptophan and glutamate improve cyanide ion production and gold adsorption by that bacteria. While glutamate was sufficient to support adequate cell growth, both cyanogenesis and gold solubilization were enhanced when glycine and methionine also were present. The addition of tryptophan to glutamate induced some gold solubilization, but the addition of tryptophan to media containing glycine and methionine did not enhance the level of solubilized gold. Thus it was further established that gold solubilization was enhanced under conditions which produced cyanogenesis.

Aeration has been known to have a positive effect on bacterial cyanogenesis. When selecting microorganisms and combinations of microorganisms for use in this invention, as taught by the described procedures, oxygen tension levels should be carefully be maintained and controlled. It has been shown, for example that aerobic stationary *Pseudomonas aeruginosa* cultures produce significantly less hydrogen cyanide as compared to shake cultures. This organism, grown anaerobically using nitrate respiration, produced very low amounts of hydrogen cyanide. The extent of aeration influences both growth and cyanogenesis. Oxygen may be necessary as an electron acceptor. Oxygen also appears to influence the regulation of bacterial cyanogenesis. Aerobic conditions result in the inactivation of the cyanogenic enzyme system and may play a physiological role in the termination of cyanogenesis during culture cycle.

The control of oxygen is another feature which may be used as a control mechanism when practicing this invention. Vigorous growth and metabolism require a high respiratory rate which could result in reduced oxygen tension within the cell which, in turn, could protect the hydrogen cyanide synthase. This, along with high internal glycine levels, could result in significant enzyme production. Aerobic conditions favor cyanogenesis, yet they also favor respiration for which cyanide is a classic inhibitor. To avoid this, cyanogenic organism may metabolically detoxify cyanide or selectively turn to cyanide resistant respiration during cyanogenesis. This is the case with both *Chromobacterium violaceum* and *Pseudomonas aeruginosa*.

One characteristic of bacterial cyanogenesis in batch cultures is the temporal relationship between hydrogen cyanide production and growth phase. Cyanide is produced mainly during a discrete portion of the cultural cycle corresponding to the transition between log and stationary phases. Cyanogenesis does not occur exclusively during this time period, however, with *Chromobacterium violaceum* as well as in certain Pseudomonas species, it can be seen that very low levels of cyanide are produced during log growth. The massive production of hydrogen cyanide at the end of log growth will present an amplification of this low rate. It was shown that this amplification can be prevented by inhibitors of protein synthesis. The synthesis of the cyanogenic enzyme system must occur during the later part of the culture cycle, a conclusion which is supported by the dramatic increase in specific activity of the hydrogen cyanide synthase as the culture cycle progresses. It is also possible to induce cyanide ion production after the culture is in contact with the ore. In this embodiment little cyanide ion is produced by the culture until the culture is contacted by the ore where natural inducers of cyanide ion may reside. This is one way to control the production of cyanide ion.

For example, the ore may contain an iron that can cause induction of cyanide ion during contact with the ore. The production of hydrogen cyanide by *Chromobacterium violaceum* and *Pseudomonas aeruginosa* also is known to be significantly influenced by iron. In gram-negative bacteria, secondary metabolism, including cyanogenesis tends to be stimulated by increases in the level of iron at amounts of iron in the medium that are greater than the concentration of iron required for growth but below that at which it becomes toxic. So, iron has no measurable effect on the amount or rate of growth, however, it can dramatically affect the amount of synthesis of secondary metabolites. In grampositive bacteria manganese can operate the way, and in the fungi, a range of metals, particularly cooper and zinc. With *Pseudomonas aeruginosa* the influence is specific to iron; cobalt, copper, manganese or zinc cannot act as a substitute. Iron concentrations which allow complete cell growth, added as ferric chloride for *Pseudomonas aeruginosa* or ferrous sulfate with *Chromobacterium violaceum*, limits cyanogenesis by these organisms. The concentration response to this metal ion is different with the two organisms and one skilled in the art will be able to adjust accordingly.

Bacterial cyanogenesis responds dramatically to cultural phosphate levels. This occurs in both *Chromobacterium violaceum* and *Pseudomonas aeruginosa*. Hydrogen cyanide production is greatly influenced by concentration of phosphates which permit optimal cultural growth. As with the iron effect, there are significant differences in the response of these two organism to inorganic phosphate. With *Pseudomonas aeruginosa* maximum hydrogen cyanide production occurs within a narrow range of phosphate concentrations which are sufficient to cause only minimal hydrogen cyanide production by *Chromobacterium violaceum*. At the time of cyanogenesis, optimal levels of phosphate are required. Adding phosphate at the time of culture cycle from lower nonpermissive to permissive levels is quickly followed by hydrogen cyanide production. This type of response also occurs with shiftups of iron level (0.5 to 20 micromolar) during periods of cyanogenesis. These shift-ups are accompanied by synthesis of hydrogen cyanide synthase which is preventable by protein synthesis inhibitors. Shifting phosphate from permissive to upper nonpermissive levels results in prematurely shutting down cyanogenesis. The motive actions of these minerals is not clear. The iron and phosphate influence may be of a general nature, controlling cyanogenesis indirectly. In any event, the methods described herein should assist one skilled in the art in maximizing and timing of cyanogenesis in microorganisms.

In addition to the aforementioned criteria relevant to selecting the proper bacteria and maximizing its ability to produce cyanide, this invention provides methods for optimizing gold extraction by controlling the kinetics of cyanogenesis.

The rates of dissolution of gold in cyanide solution is related to surface area, agitation, cyanide concentration, oxygen pressure, temperature, pH and of various impurities. These factors may be manipulated by the selection and control of microorganisms to enhance gold recovery.

Regarding surface area, there is a linear relation between the size of gold particles (10 $\mu$-100 $\mu$) and the time required for its dissolution.

Regarding the effects of agitation, the rates of dissolution of gold increases as the square root of the number of rpm, up to about 1000 rpm. The rate of gold dissolution increases linearly with the number of rpm up to about 150 rpm, then it decreases and becomes nearly constant.

The rate of dissolution of gold increases sharply with an increase in cyanide concentration, up to a limit. Beyond this, further increases in cyanide concentration tends to decrease the rate of dissolution. The cyanide concentration at which the dissolution rate of gold is maximized have been reported by many investigators. The concentration of cyanide at which the maximum dissolution rate is observed depends on the oxygen pressure. This invention uses a small amount of cyanide ion to dissolve the gold. Thereafter, the gold ion-cyanide ion complex rapidly is adsorbed, by biosorption driving the dissolution reaction forward. The biosorption reaction is a nonequilibrium reaction. When in contact with an ore body, the microorganism culture will absorb gold under very fast kinetic conditions such that very little cyanide ion or gold ion-cyanide ion complex will be free in solution, thus driving the gold solubilization reaction. This may be especially useful with carbon containing ores. Carbon containing ores adsorb the gold ion-cyanide ion complex and because of this, such ores cannot be successfully mined with the current cyanide processes. Studies with *Chromobacterium violaceum* have confirmed that the organism produces cyanide steadily during the stationary phase to replace cyanide removed as the [Au(CN)2]-complex.

The effect of temperature on the rate of dissolution has been measured by many researchers for the purpose of determining the activation energies. Since other variables such as oxygen pressure, rates of agitation, cyanide concentration and the pH also effect the rates of dissolution, it is hard to generalize. Nevertheless, the activation energies reported are usually low, 2.4–3.5 for Ag, 3.5 to 5.0 for Au except, at high agitation rate the activation energy for Au is near 14 Kcal/ml.

Impurities at the metal solutions interfaces may adversely affect cyanogenesis through absorption. The absorption of xanthates on gold, for example prevent or decrease the rate of dissolution by cyanide ion. Transition metal cyanide complexes may absorb to gold ion-cyanide ion complexes and reduce the rates of their dissolution. $Ca^{2+}$, especially at very high pH ($>11$) reduces the rate of dissolution of gold (pH 9 is optional). $CaO_2$ formed from the reaction of $Ca^{2+}$ with $H_2O_2$ deposits on the surface of gold and may cause the formation of a protective coating. Not all impurities effect the cyanidation process adversely. Salts of lead, Bi, Th can increase the rate of dissolution.

Those skilled in the art will appreciate that each of the factors discussed in this section may be manipulated to increase cyanide ion production.

DETAILED DESCRIPTION OF PREFERRED EMBODIMENTS

EXAMPLE 1

This invention may be practiced using mass cultivation of microorganisms in outdoor ponds. A shallow pond should be dug out in the vicinity of the ore body, preferably in an area with broad sunlit areas. In temperate climates, the pond may be set up to operate year-round. In harsher climates, the pond could be set up to operate in the summer months and allowed to be dormant in the winter months. Species specific cultivation technology will have to be developed for the microorganisms or combinations of microorganisms selected. The goal is to have continuous maintenance of the desired strains for prolonged periods of time. A considerable number of methods for large scale outdoor culturing of microorganisms has been developed in the last ten years for production of what is called "single cell protein." It is desirable to minimize invasion by pests, weeds and other unnecessary plants and animals. For the microorganism species mentioned, the literature teaches about specific environmental factors which affect specific species and result in their dominance or replacement by competing species. Prior to inoculating a pond with a microorganism, the selected microorganism should be studied in a natural environment system and a laboratory system. The following operational variables should be studied and adjusted to optimize the requirements of high productivity and species control: mixing, dilution rate, nutrient concentrations, depth and pH). See Richmond, A. *Environmental Limitations in Outdoor Production of Algal Biomass*, Algal Biomass 65–72 (G. Shelef and C. J. Solder, ed. 1980) Elsevier/-

North Holland Biomedical Press (hereby incorporated by reference).

The culture pond should be shallow, approximately 10 to 30 meters wide, baffled and approximately 20 to 50 centimeters deep. An optional cover may be used to prevent water and/or cyanide ion evaporation. As will be discussed further herein, the pond should have a pumping system for intermittent mixing, removal of microorganisms for harvesting and recirculation of the media. Pumping through the system should provide sufficient mixing for a pond of the dimensions stated above, however for a discussion of useable pumping systems; see, Persoone, G. et al. *Airlift Pumps and the Effect of Mixing on Algae Growth*, Algae Biomass 505–522 (G. Shelef and C. J. Soeder, ed. 1980) Elsevier/North Holland Biomedical Press (hereby incorporated by reference). The pond may be lined with black plastic or concrete to retain heat. The pond should have year-round optimal ground cover so as to maximize utilization of sunlight. Invasion of the pond by other species should be controlled. The protein content of the micro-algal biomass should be about 50% of dry weight.

EXAMPLE 2

Algae or Blue-Green Cyanobacteria are the preferred microorganisms because of convenience. Bacteria may be more expensive to feed and cultures are more susceptible to invasion by competing bacteria and other colonizing types of microscopic pond life, however they can be used in the process. Each algal species has a range of tolerated nutrient compositions, physical and chemical conditions. Phosphorous, nitrogen, sulphur, iron, magnesium and manganese, as well as trace metals and ions are required nutrients. Some green algae, particularly the flagellates need vitamins and some cofactors. Discretion must be exercised when extrapolating laboratory results to a natural environment; nevertheless, laboratory results are very useful in determining most physiological requirements and operative ecological phenomena.

When selecting microorganisms for this invention, species able to produce cyanide at acceptable levels should be used in the culture pond. Likewise, species able to optimally adsorb gold in the presence of cyanide also should be selected. A combination of microorganisms may be used. Regardless of whether a single or multiple microorganisms are used, it is important to maximize cyanide ion production by the selected microorganism(s), both by the initial selection process and by controlling conditions. Methods for qualitatively and quantitatively determining the production of cyanide are well known. See e.g., Brimer, L., *Determination of Cyanide and Cyanogenic Compounds in Biological Systems*, 1988 Ciba Foundation Symposium 140, Cyanide Compounds in Biology: 177–196, which is hereby incorporated by reference.

Algal species which may be used to practice this invention include *Chlorella vulgaris*, *Cyanophora paradoxa* and *Cyanidium caldarium* and *Anacystis nidulans* (Blue-Green Algae/cyanobacteria). *Cyanophora paradoxa* and *Cyanidium caldarium* these are available from Carolia Biological Supply Co., 2700 York Road, Burlington, N.C. 27215. Other species are available from the ATCC, or various other culture collections. For a comprehensive list of culture collections and addresses see: *World Directory of Collections of Cultures of Microorganisms*, 2d ed. issued by World Data Center on Microorganisms, (V. F. McGowan & V. B. D. Skerman, eds). Univ. of Queensland, Brisbane, Australia 1982. Likewise, the following species of bacteria are prolifically cyanogenic and may be used: *Chromobacterium violaceum; Chromobacterium flavum; Bacillus pyocyaneus; Bacillus flourescens; Bacillus violaceous; Bacillus megaterium; Bacillus mesentericus; Bacterium nitrificans; Pseudomonas aeruginosa; Pseudomonas fluorescens; Pseudomonas aureofaciens; Pseudomonas cyanogena; Pseudomonas liquefaciens; and Pseudomonas cepacia*. Certain fungal species are known to produce large amounts of cyanide ion, particularly basidiomycetes and ascomycetes. *Marasmius oreades* (which causes fairy ring disease) and the snow mould basidiomycete may be used in this invention, as well as members of the Fusarium species. Plant tissue culture also may be used in this invention, although it is more difficult and expensive to work with than algae or bacteria. The following cyanogenic plants may be used: *Phacelia sericea, Artemesia terras alba*, and *Prunus laurocerasus*.

The methods of growing algae, bacteria and fungi for this invention are well known. Micro-algae single cell production is similar to conventional agricultural processes and much has been written about this topic. See Benemann, J. R., et al., *Algal Biomass*, reprinted in 4 Economic Microbiol. 177 (A. H. Rose Ed. Academic Press 1979) (hereby incorporated by reference). Modern molecular biological methods and fermentation methods have advanced tremendously in the last few years due to commercialization of genetically engineered microorganisms.

EXAMPLE 3

This invention may be practiced with *Chromobacterium violaceum*. The laboratory growth methods disclosed in Smith, A. D. and Hunt, R. J. *Solubilisation of Gold by Chromobacterium violaceum*, J. Chem. Tech. Biotechnol. 1985, 35B, 110–116 (hereby incorporated by reference) can be supplemented by conventional fermentation methods to prepare the bacteria for inoculation into the outdoor culture pond. Prior thereto, however, this bacteria should be studied in a pilot pond under environmental conditions similar to those present at the desired site. Isolation and growth of microorganisms in laboratory cultures could result in loss of properties that would be maintained in natural environments by strong selective pressures. For this reason a pilot pond is suggested. Moreover, the pond likely will result in the development of particularly useful strains. Strains capable of high gold ion selectivity and affinity and low affinity for the other metals present at a given site are most useful in practicing this invention. The high selectivity and affinity phenomena may be exploited using artificial selection and genetic engineering methods.

Cyanide is produced by *Chromobacterium violaceum* during the growth and stationary phase of culture and the solubilized gold species has been shown to be the complex anion $[Au(CN)_2]^-$. Solubilization of gold becomes apparent after the end of exponential growth in moderately alkaline pH (pH9) and steadily increases thereafter.

Much has been published about the nutrient requirements of the microorganisms which may be of use in practicing this invention. (See e.g., Taub, F. B., *Use of Continuous Culture Techniques to Control Nutritional Quality*, Algal Biomass, 707–721 (G. Shelef and C. J. Soeder, ed. 1980), Elsevier/North Holland Biomedical Press (hereby incorporated by reference). Conditions known to optimize growth and/or cyanide ion production and/or gold absorption should be adapted for the applicable environmental conditions at the selected site. In the case of *Chromobacterium violaceum*, for example, laboratory studies show that a medium containing concentrations of glutamate, methionine, tryptophan and glycine as described by Rodgers, P. B. and Knowles C. J., *J. Gen. Microbiol.* 108:261 (1978) should be used. When practicing this invention, one may pilot test adding microorganisms which optimally produce glutamate, methionine, tryptophan and/or glycine to the pond. Many microorganisms are known to release these amino acids as by products of metabolism. So long as these microorganisms do not interfere with the growth of the desired species *Chromobacterium violaceum*, or so long as the cohabitation of any added species can be adequately controlled, adding such microorganisms is an inexpensive source of nutrients for the desired cyanide ion and/or gold adsorbing microorganisms. More preferable is a microbe capable of cyanide ion production at the site of the gold ore. For example algae are grown photosynthetically in shallow ponds with nitrogen fertilizers and phosphates. This organism does not require special fermentors or phosphates and can be raised in an agricultural setting (i.e., shallow ponds, nitrogen fertilizers, a simple carbon source and ambient temperatures).

EXAMPLE 4

A continuous algae or photosynthetic bacteria culture is preferred for practicing this invention. Accordingly, the growth kinetics of the microorganism selected must be considered. The non-steady state factors cannot be ignored and there is no available formula or program for accounting for them. For example, theories which predict algal productivity or algal species competition are complicated by the fact that large scale ponds have a plug-flow component (i.e., they are not perfectly mixed) and are exposed to temperature and light intensity variations. These non-steady state components in mass culture, and the fact that the conditions are constantly changing present severe difficulties in developing an accurate mathematical formula for outdoor microorganism mass culture. Some computer programs are available to determine growth and protein yield of certain species as a function of growth conditions, for example, the Dabes et al. program (1970) studies growth and yield of Chlorella in chemostats as a function of photosynthetic intracellular parameters. (See also Endo, H., and Shirota, M., *Studies on the Heterotrophic Growth of Chlorella in a Mass Culture*, Proc. IV IFS: *Ferment. Technol. Today*, 533-541 (1972) (hereby incorporated by reference). Since none of these studies can be extrapolating in toto to the natural environment, we recommend pilot testing at the desired site. Every natural environment where this invention is practiced will be different, a pilot or small scale operation in the desired location should be used. In any event, the following formula and the commercially available programs are a good approximation. As noted and explained by Breneman J. R. et al., cited supra, growth can be represented by continuous-culture theory as formulated by Monod and developed by Herbert et. al. *J. Gen. Microbiol.* 14, 601 (1956).

$$\mu = \frac{IdN}{Ndt}$$

The relative growth constant $\mu$ (which represents the instantaneous growth rate where t indicates time and N is cell concentration) is related to the doubling time G of the algal cells (which, in the absence of recycling, is the same as the hydraulic detention time of the culture) by the equation $\mu = 0.69/G$. When everything is constant, larger algae would be expected to grow slower due to smaller surface:volume ratio. Preferably, small nonfilterable algae would more freely contact and pass through fragmented, milled or crushed ore.

In a chemostat one nutrient often becomes the limiting factor for cell growth in determining cell concentration (X) and thereby productivity ($p = \mu X$). The relationship between substrate concentration and cell growth normally is expressed by Monod kinetics. However, intracellular nutrient concentrations are more immediately responsible for observed growth rates than extracellular nutrients. Since light is the key growth-limiting nutrient in the preferred algal or Blue-Green Cyanobacterium embodiment, it is the one of interest. Sunlight, being a combination of wavelengths absorbed by pigments of different absorption bands, must be considered a multiple nutrient. Algal species that use different portions of the spectrum preferentially may co-exist in the pond. Despite this possibility in natural environments, the chemostat theory theoretically excludes the possibility of co-existence of two species on a single limiting nutrient.

Controlled cultivation of micro-algal species must be accomplished within limits imposed by engineering feasibility and economic reality. This prevents the use of sterile growth units and media. As already discussed, species-specific cultivation technology will need to be tailored for the specific site in order to allow continuous maintenance of particular inoculated strains for prolonged periods of time. The inocula themselves can be built up under successively less rigorously controlled conditions. The inoculation level and degree of control over its production will be parameters determining the economics of such systems. The minimum engineering and operational characteristics of large-scale pond systems designed for low-cost, high productivity algal cultivation are reasonably well known (Oswald, W. J. and Golueke, C. G. (1960) *Advances in Applied Microbiology* 2:223. The basic design is called a "high-rate pond", a large, shallow compacted dirt pond bordered by a low level (about 1-1.5 m high), divided into a long, continuous 10 to 30 m wide channel by means of baffles. The operational pond depth is 20 to 50 cm, depending on the engineering requirements of leveling and mixing, and the operational optimization of temperature fluctuations, algal concentrations and harvesting costs. Mixing is provided by one or more mixing stations using very low head-high capacity pumps or, preferably, paddlewheels. In general, constant low-mixing speed of 10-30 cm/sec are used; however, a variable mixing schedule might allow minimizing power requirements while preventing algal settling. Power requirements for mixing are relatively minor as long as mixing speeds do not exceed about 30 cm/sec.

The costs of a high yield algae protein production have been extensively studied for "single cell protein" systems. The pond construction costs are relatively low for the basic earthworks, baffles, paddlewheels and influent and effluent structures. Except for a concrete apron next to the mixing stations, the ponds can be unlined, with sealing provided by a clay layer in high-porosity soils. Spray sealing of ponds with a thin impermeable asphalt or plastic layer might be feasible and would be desirable to hold in the heat in cold weather. The costs of ponds are only slightly higher than preparation of agricultural crop lands. Nutrient supply, including carbon dioxide injection, would not be a significant expense; but the choice of the nutrients can be of critical importance for high density algae and cyanide, or production. Assuming a rate of inorganic nutrient recovery similar to that in agriculture, inorganic fertilizers would be utilized for micro-algal single cell production at an equivalent economic cost. Since microalgae are effective in decreasing nutrient concentrations in natural, eutrophic, and even highly fertilized bodies of water, micro-algae might utilize nutrients more effectively than higher plants. The minor nutrients and micro-elements should not provide any special difficulties; they may even be provided from sea salts.

Provision of a carbon source such as methanol or carbon dioxide to ponds is a parameter which should be considered. Algae production differs from conventional plant cultivation, in which carbon dioxide is provided from the air. The diffusivity of carbon dioxide across the air-water interface can severely limit algal productivity, and may require both an enriched carbon dioxide source and a mechanical process for its introduction. Although pond carbonation is not difficult, it requires some engineering development for maximum productivity.

Only a limited number of interrelated operational variables can be adjusted during pond operations. These include hydraulic dilution and loading rate, mixing velocity and schedule, inorganic nutrient concentrations, depth and pH value. Many of these are, of course, interacting. It is possible to vary detention times of various types and sizes of organisms independently, allowing some control over algae and bacterial populations. Insolation and temperature cannot be controlled, and must consequently be compensated for by changing pond operations. Small-scale (10 m$^2$) high-rate oxidation ponds have been operated under various regimens of detention times, mixing and selective biomass-recycle to determine the conditions under which large, filterable, colonial or filamentous algae are cultivated. Pond detention times are an important factor in determining the morphology and size of the pond algae, and thereby their use in ore bodies or milled ore, crushed ore, or fragmented ore bodies in situ.

Algae is preferred for practicing this invention because it is inexpensive and easy to cultivate. The pond should be in optimal sunlight to provide energy for photosynthetic algae. Procedures for mass-cultivating *Chlorella* are taught in Krauss, R. (1962) *American Journal of Botany* 49, 425; Pistorius, E. K. et al., *Reversible Inactivation of Nitrate Reductase in Chlorella Vulgaris in vitro, Planta* (Berl.) 128, 73-80 (1976) (hereby incorporated by reference). The pH of the pond should be maintained between pH 7-10 using limes or phosphate buffers, preferably phosphate buffers and at an approximate temperature of 36° C. A good source of nitrogen for the algae would be fertilizers or ammonia. Other nitrogen sources include urea and nitrate nitrogens. If there is insufficient carbon dioxide from pumping action through the pond, a carbon source such as acetate or methanol may be added. Other possible carbon sources include ethanol, glucose, galactose, acetic acid, acetaldehyde and pyruvic acid. The algae should be cultivated continuously in yields of 40 dry tonnes/hectare/year. As previously mentioned, the pond could have a pump or spray means to transport the algae from the culture pond to the nearby ore body.

The ore body may be either a heap, an in situ blasted piece of rock or milled, crushed or pulverized rock. Preferably the ore body will be a pile of cracked ore or pulverized ore piled in heaps or in tanks. The invention is not so limited, however, because the microorganism culture in a fermented tank or pond may be pumped into surface mines or deep mines (for example in in situ operations in which the ore has been blasted and pulverized). Ore grades of approximately 0.02 oz. per ton or higher (up to 0.5 oz. per ton) may be treated using these methods.

The algae and/or bacteria should be pumped from the culture onto the ore body at a time of maximal cyanide production. Usually this occurs in late log phase, however, methods for maximizing cyanide production are discussed in detail in the next section. Once the algae or bacteria is in contact with the gold in the ore body, oxidation of gold to gold ion-cyanide ion complex will occur, then biosorption of the soluble gold ions will be automatic and immediate. Indeed, the biosorption process will occur with most bacteria and algae even if the microbes are dead.

The microorganisms containing the adsorbed gold then should be pumped to a settling pond or vessel. The settling pond should be relatively deep, preferably more than 12 feet and should be unstirred. The algae and/or bacteria containing the adsorbed gold will settle to the bottom of the pond in a pulp or a slurry. The use of flocculants can enhance this process step. The sludge, slurry or pulp will contain both live and dead microorganisms containing the biosorped gold ready to be harvested and sent to the refinery. Suitable methods for drying the microorganisms would include spray drying, vacuum or sun drying, if they are to be dehydrated.

Harvesting has been a limiting economic factor in micro-algal biomass protein production processes. The dilute nature of the standing crop in micro-algal cultures (150-700 mg per liter), the microscopic size of the plants, the large volume that must be processed due to continuous operation of the ponds, and the large differences between micro-algal types complicate harvesting for protein production. Benemann, J. R., et al., 4 *Economic Microbiology* 179-203 (A. H. Rose ed. Academic Press 1979). In practicing this invention, mass settling and/or flotation are the methods of choice. Settling is inexpensive and suitable for a small, but deep settling pond. Chemicals may be added to facilitate settling. Large quantities of adsorbed gold is toxic to most microorganisms and killed organisms can be expected to settle out. Centrifugation, chemical flocculation using lime or alum, coagulation, filtration and screening techniques may also be adapted for harvesting the microorganisms containing adsorbed gold. Large colonial micro-algae may be removed from pond effluents, concentrated using fine mesh screens then removed by spraying. For a discussion and evaluation of numerous devices and methods for harvesting microalgae from culture, see Mohn, F. H., *Experiences and Strategies in the Recovery of Biomass from Mass Cultures of Microalgae*, Algal Biomass, 547-71 (G. Shelef and C. J. Soeder, ed. 1980) (Elsevier/North Holland Biomedical Press) hereby incorporated by reference. See also Benemann, J., et al., *Development of Microalgae Harvesting and High-Rate Pond Technologies in California*, Algal Biomass, supra at 457-495 also hereby incorporated by reference.

The water in the settling pond or vessel will contain living microorganisms and this water, along with the dilute microorganisms should be recycled back to the culture. By reinoculating the culture pond or vessel with microorganism variants which are resistant to cyanide and toxic metal ions which may have been released from the ore body, yields should be improved in subsequent cycles. Such organisms are most useful in practicing the invention. One can also develop genetically engineered or mutanized strains with enhanced or controllable cyanide ion production capabilities. The preferred embodiment is a continuous system in which the cycle is run over from several days to several months. The flow of water should be dictated by the size of the ore body.

EXAMPLE 5

This invention may be practiced using two different microorganisms, one of which is capable of producing cyanide optimally and another which is capable of biosorption of gold optimally in the presence of cyanide. For example, an algae may be used with a bacteria or two different algae species may be used. In a one or two microbe system, the microbes could be settled or collected by filtration, centrifugation or spray drying according to known methods.

Instead of a second microorganism, plant tissue culture might be used in some embodiments. Some plant varieties are known both to produce large amounts of cyanide ion and to absorb gold ions. Some algae are known to be low producers of cyanide ion (less than 1 ppm cyanide ion) but very high gold ion and Au° biosorpers. Most gold biosorping bacteria will adsorb gold even if they are dead. These may be used with a bacteria, plant tissue culture or fungi which are high cyanide ion producers. The bacteria *Pseudomonas cepacia* is a good gold biosorper, and may be used for this purpose according to the methods described in Hisham, D. P., et al., *Gold Resistant Bacteria: Excretion of a Cystine-Rich Protein by Pseudomonas cepacia Induced by an Antiarthritic Drug*, J. Inorganic Biochem 28:253-261 (1986) (hereby incorporated by reference). Since this is a non-equilibrium system, even a small cyanide ion concentration will dissolve the gold and the microorganisms will rapidly biosorp the gold ions leaving a low cyanide ion concentration and gold-cyanide ion complexes in solution. Once the microorganism absorbs the gold cyanide ion complex it may reduce the gold ion back to Au°. The microorganism may metabolize the cyanide ion leaving the readily reducible $Au^{1+}$, $Au^{2+}$ or $Au^{3+}$ in the cell.

In another embodiment, a microorganism may be artificially selected which is either a good cyanide ion producer and/or a good gold biosorper. One would do this by selecting or screening for a microorganism which is capable of excessive cyanide ion production and mutanize it according to known methods then screen for increased cyanide ion production. After mutanizing the microorganism one should check for both cyanide ion production properties and mutagenesis properties. Other criteria that may be useful to artificially select for include growth rate conditions which are susceptible to control and tolerance to metal toxicants which may be released from the ore bodies. Once suitable microorganism strains have been selected and improved by natural or artificial selection, one may use the modern tools of molecular biology and cloning to genetically engineer microorganisms capable of either high cyanide ion production and/or high gold absorption. The first step would be to obtain a genes for the cyanogenesis pathway in the organism selected. Genetic engineering methods may be used to identify the enzymes that are part of the cyanogenic pathway. These then may be purified sequenced and cloned. Thereafter vectors for introducing these genes into the microorganisms to increase cyanide ion production would be used. (See Hughes, M. A. et al., the *Molecular Biology of Cyanogenesis*, 1988 Cyanide Compounds in Biology, 1988 Ciba Foundation Symposium 140 111-130.

Biosorption of gold ion-cyanide ion complexes

This section discusses factors relating to increasing gold adsorption. Biological interactions with metals are numerous and complex. All evidence indicates that gold which has been solubilized by cyanide can only exist in solution for short periods of time and cannot migrate substantial distances before it is rendered insoluble. The microorganisms used in practicing this invention all are capable of almost instantaneously removing gold cyanide ion complexes, especially the gold (I) ion, from solution by a variety of means. Generally, concentration and removal of gold ion-cyanide ion complexes from solution may be accomplished by precipitation through biooxidation or bioreduction, or through large scale formation of a metabolic product which precipitates metals or by biosorption. It is preferred that the organisms are alive when biosorption is caused in the process of this invention. It should be understood that this invention is a process for gold recovery from ores and that various microorganisms with their inherent properties can be used in the processes.

Biosorption is the adsorption and/or sequestration of metal ions by solid materials of natural origin. The mechanism of uptake may be by particulate ingestion or entrapment by flagellae or extracellular filaments, active transport of ions, ion exchange, complexation, adsorption or inorganic precipitation (e.g., by hydrolysis of sorbed species). The first two mechanisms are limited to living cells but both living and dead cells can perform the remaining mechanisms. Many marine microorganisms, for example, accumulate radionuclides in the sea by direct adsorption from water. The reversible flocculation of activated sludge bacteria with the help of bivalent cations like $Ca^{2+}$ or $Mg^{2+}$ is thought to be the result of ionic bond bridges formed among negatively charged cell surfaces and cations in solution.

The sequestered metals may be found anywhere in the cells, from extracellular polysaccharides to cytoplasmic granules, depending on the microbial species and/or the mechanism of metal deposition within the cell. Cell walls of prokaryotes and eukaryotes contain polysaccharides as basic building blocks. The ion exchange properties of natural polysaccharides have been studied: bivalent metal ions are known to exchange with counterions of the polysaccharides.

Microorganisms exhibiting high uptake of metals frequently sequester them within the cell wall via two mechanisms. The first is a stoichiometric interaction, either ion-exchange or complexation, between the metal ions and active groups such as phosphodiester (teichoic acid), phosphate, carboxyl (glycosides) and amine (amino- and peptido-glycosides and bound protein) on the polymers making up the cell wall. Further uptake is the result of inorganic decomposition via adsorption or inorganic precipitation such as hydrolysis.

Some microorganisms also can accumulate metals, including gold, intracellularly, sometimes because they need these metals for enzyme function. Special transport systems in both prokaryotes and eukaryotes operate in the cell envelope to pull the metals in ionic form through the cell membrane and into the cell interior. Some transport systems are nonspecific and are capable of transporting several different metal ions, with different affinities. The metal ions often compete in such systems for translocation, depending on their respective concentrations. Other transport systems are extremely specific. Both cationic and anionic species may be transported. In some cases, the metal transport into the cytoplasm requires energy. Many prokaryotes, including all bacteria, are able to enzymatically derive energy from metal oxidation and reduction. Enzymes for this purpose are located in the cell envelope. Bacteria, algae and fungi also undergo small-scale enzymatic interactions with metals, for example assimilation and detoxification.

Microorganisms use metallothioneins in uptake of metals. Metallothioneins are induced by, and/or have a high binding capacity for certain metals, some with great affinity and selectivity. Amplification of production of metallothioneins by microorganisms and enhancement of certain metallothione characteristics are possible by genetic engineering. For example, modification of the primary structure of these proteins may increase gold binding capacity, specificity and the ability to exist in harsh conditions.

Those skilled in the art will recognize that for enhancement of the biosorption properties of the microorganisms used in this invention, it is necessary to identify and understand the active agents and components involved in the intracellular uptake and biosorption of the gold.

One such active agent may be the cyanide ion part of the gold ion cyanide ion complex. Several microorganisms are known to degrade cyanide ion. For example the fungi, Rhizopus Oryzae, ATCC 62073, has been shown to degrade cyanide ion, Padmaja, G., and Balagopal, C., "Cyanide degradation by Rhizopus oryzee", Canadian J. Microbiology 31, 663-669 (1985), as well as Stemphylium loti, ATCC 24601, Fry, W. E., Millar, R. L., Arch. Biochem. Biophys. 151, 468-474 (1972). Other microorganisms such as the Bacillus subtilis ATCC 21697 also known as Achromobacter nitriloclastes, and Corynebacterium sp. ATCC 21698 also known as Alcaligenes biscolactis ("Degradation of nitriles and cyanides in waste water effluent"), U.S. Pat. No. 3,756,947, and Rhodococcus rubroperticus ATCC 21930 also known as Nocardia rubropertincta ("Degradation of nitriles and cyanides in waste water"), U.S. Pat. No. 3,940,332 are also known to degrade cyanide ion. We studied the microorganism, Pseudomonas paucimobilis ATCC 39204, obtained from Homestake waste water treatment plant in Lead, South Dakota. These microorganisms, like others obtained from gold mining waste water treatment ponds, are known to degrade cyanide ion in the waste water. Such microorganisms, in the presence of very small amounts of gold ion cyanide ion, degrade the cyanide ion and were found to recover the gold by bioabsorption. The experiments described in Examples 6, 7 and 8 demonstrated this discovery.

EXAMPLE 6

A sample of a cyanide degrading bacteria was obtained directly by scraping reactors at the Homestake waste water treatment plant in Lead, S. Dak. The microorganisms, in the form of a dense mass of about 5 mls, were used to inoculate one liter of media then removed by straining. The culture was grown for three days at 37° C. in 30 gm/lit. of Tryptic-Soy broth (Connecticut Valley Biological Supply, South Hampton, Massachusetts 01073), containing approximately 1 ppm in cyanide, and 0.02 M phosphate buffer at a pH of about 8.5. After three days at 37° C., in order to keep the culture resistant to cyanide, CaCN was added to make the medium approximately 2-3 ppm in total cyanide. After a total of six days, a gold [I] potassium cyanide solution, $KAu(CN)_2$, was added to give a final concentration of about 7.6 mg/lit. Prior analysis of the $KAu(CN)_2$ solution, by atomic absorption analysis, indicated that the concentration in the culture would be about 5 ppm gold. The culture was separated into two cultures of 250 ml and 500 ml. To the 250 ml culture, 20 gm of powdered carbonaceous ore from the Carlin Gold Mine (Carlin, Nev.) obtained from the 6,180-foot level, were added to the culture and this culture/ore suspension maintained at about 23° C. for three days. The separate 500 ml bacteria culture was kept at the same temperature (approximately 23° C.) also for three days. The ore was separated from the bacterial/ore sample suspension by letting the ore settle out for about one hour. The bacterial culture was then clarified by centrifugation, and the collected bacteria were dried at room temperature and weighed. Approximately 0.3 gms of dried bacteria were obtained. On ashing at 500° C. for about 18 hours, this gave 0.135 gms of solid material. The 500 ml culture was also clarified and the bacteria collected dried and ashed, giving 0.14 gms dried and 0.054 gms on ashing. The supernatant media from both cultures, now substantially free of bacteria, were evaporated by heating at 100° C., and then treated at 100° C. with a 50/50 v/v solution of concentrated hydrochloric (37%) and concentrated nitric acid (100%). This liquid was then filtered and dried at 100° C. then analyzed for total gold by Inductively Coupled Plasma Emission Spectroscopy, at Spectro Analytic Instruments, 160 Authority Drive, Fitchburg, Mass. 01420. The collected, dried and ashed bacteria from the 250 ml Carbonaceous ore treated culture and the 500 ml culture were heated to 100° C. with concentrated hydrochloric and nitric acid as described above. After at least one hour acid heat treatment, the two samples were filtered and the liquid evaporated taken up in 1.0 M HCl, then analyzed for total gold also by Inductively Coupled Plasma Emission Spectroscopy. From the 250 ml ore treated culture, 68.5 μg of gold were obtained from the bacteria (228 ppm), and 118 μg of gold were obtained from the clarified media (0.59 ppm). From the 500 ml culture, 28.9 μg of gold were obtained (206 ppm), and from the media, 826 μg of gold were obtained (1.62 ppm).

EXAMPLE 7

A solution of 30 gm/lit of Tryptic-Soy broth with 0.02 M phosphate at pH 8.5 was made about 5 ppm in gold potassium cyanide, $KAu(CN)_2$ (7.5 mg/lit). About a 5 ml sample of dense bacterial culture taken from the Homestake waste water treatment plant was added to the medium. After 5 days, the sample of the dense bacterial culture was removed by straining and dried. The suspended new bacterial growth culture was collected by centrifuge and dried. The two bacterial samples were ashed at about 500° C. Also, the clarified medium was evaporated. The dried media sample and the ashed bacterial samples were treated with the concentrated hydrochloric and nitric acid mixture, filtered, dried and taken up in 1.0 M HCl as described in Example 6. Total gold was determined by atomic absorption analysis for each sample at the Carter Analytic Laboratories, 95 Lost Lake Lane, Campbell, Calif. 95008. On drying, the dense bacteria recovered by straining weighed 0.2 gms, and on ashing, weighed 0.09 gms. This material was found to contain 18 $\mu$g gold, or 90 ppm. The new growth culture was found to be 0.2 gms and on ashing was 0.05 gms. This material was found to contain 25.5 $\mu$g gold, or 127 ppm. The 250 mls of clarified and dried media were found to contain 160 $\mu$g gold, or 0.64 ppm.

EXAMPLE 8

About a 5 ml sample of dense bacterial culture taken from the Homestake waste water treatment plant was added and grown for 4 days in a 700 ml culture of 30 gm/lit of Tryptic-Soy broth with 0.02 M phosphate at pH 8.5. At that time, gold potassium cyanide was added to give about 5 ppm in gold potassium cyanide, $KAu(CN)_2$ (7.5 mg/lit) and 20 gm of the carbonaceous ore powder from the Carlin Gold Mine (Carlin, Nev.) obtained from the 6,180-foot level, was added to the 700 ml culture. After 3 days, the sample of the dense bacterial culture was removed by straining and dried. After the ore had settled out, the suspended new bacterial growth culture was collected from the media by centrifugation and dried. The two bacterial samples were ashed at about 500° C. The 700 mls of clarified media were also evaporated. The dried media sample and the ashed bacterial samples were treated with the concentrated hydrochloric and nitric acid mixture, filtered, dried, and taken up in 1.0 M HCl as described in Example 6. Total gold was determined by atomic absorption analysis for each sample at the Carter Analytic Laboratories, 95 Lost Lake Lane, Campbell, Calif. 95008. On drying, the dense bacteria recovered by straining weighed 0.5 gms, and on ashing, weighed 0.2 gms. This material was found to contain 42 $\mu$g gold, or 76 ppm. The new growth culture was found to be 0.1 gms, and on ashing was 0.02 gms. This material was found to contain 9.5 $\mu$g gold, or 95 ppm. The 700 mls of clarified and dried media were found to contain 540 $\mu$g gold, or 0.77 ppm.

We claim:

1. A process for recovering gold from gold ore bodies comprising the steps of:
    a. culturing at least one microorganism species capable of producing cyanide ion under conditions wherein said microorganism produces cyanide ion, thus forming a cyanide ion containing culture;
    b. contacting said cyanide ion containing culture with gold ore, thereby causing production of gold ion-cyanide ion complexes and dissolution of gold from the gold ore;
    c. removing, by biosorption and cyanide ion degradation, gold ion-cyanide ion complexes from solution to said culture thereby driving the gold dissolution reaction forward;
    d. reclaiming biosorped gold from said culture by further refining.

2. A process for recovering gold from gold ore bodies comprising the steps of:
    a. culturing a microorganism of at least one species capable of producing cyanide ion under conditions wherein said microorganism produces less than 1 ppm cyanide ion to no cyanide ion, thus forming a culture;
    b. contacting said culture with gold ore, under conditions wherein said culture produces cyanide ion, thereby causing production of gold ion-cyanide ion complexes and dissolution of gold from the gold ore;
    c. removing, by biosorption and cyanide ion degradation, gold ion-cyanide ion complexes from solution to said culture thereby driving the gold dissolution reactions forward;
    d. reclaiming biosorped gold from said culture by further refining.

3. A process for recovering gold from gold ore bodies comprising the steps of:
    a. culturing a bacteria of at least one bacterial species capable of producing cyanide ion under conditions wherein said species produces cyanide ion, thus forming a cyanide ion containing culture;
    b. contacting said cyanide ion containing culture with gold ore, thereby causing production of gold ion-cyanide ion complexes and dissolution of gold from the gold ore;
    c. removing, by biosorption and cyanide ion degradation, gold ion-cyanide ion complexes from solution to said culture thereby driving the gold dissolution reaction forward;
    d. reclaiming biosorped gold from said culture by further refining.

4. A process for recovering gold from gold ore bodies comprising the steps of:
    a. culturing a bacteria of at least one bacterial species capable of producing cyanide ion under conditions wherein said species produces less than 1 ppm in cyanide ion to no cyanide ion, thus forming a culture;
    b. contacting said culture with gold ore, under conditions wherein said culture produces cyanide ion, thereby causing production of gold ion-cyanide ion complexes and dissolution of gold from the gold ore;
    c. removing, by biosorption and cyanide ion degradation, gold ion-cyanide ion complexes from solution to said culture thereby driving the gold dissolution reaction forward;
    d. reclaiming biosorped gold from said culture by further refining.

5. Method of claim 3 above wherein said culture contains at least two species, one of said species capable of producing cyanide ion and the other of said species capable of biosorping gold ion-cyanide ion complexes.

6. Method of claim 4 above wherein said culture contains at least two species, one of said species capable of producing cyanide ion and the other of said species capable o biosorping gold ion-cyanide ion complexes.

7. A process for recovering gold from gold ore bodies comprising the steps of:
    a. culturing at least one microorganism species capable of producing cyanide ion in a solution under conditions wherein said species produces cyanide ion, and wherein said microorganism is at an approximate concentration of 10 mg/l to 10 g/l, thus forming a cyanide ion containing and producing culture;

b. pumping culture into or upon a fractured milled or crushed ore body, said ore body containing gold in an amount of at least 0.02 oz/ton;

c. contacting said cyanide ion containing and producing culture with gold ore, thereby causing production of gold ion-cyanide ion complexes and dissolution of gold from the gold ore;

d. removing by biosorption and cyanide ion degradation, gold ion-cyanide ion complexes from solution to said culture thereby driving the gold dissolution reaction forward;

e. removing said culture from said ore body;

f. separating gold containing microorganisms from said culture to form a sludge layer comprising said microorganisms and an aqueous solution;

g. recyclying said aqueous solution to the culture of step (a);

h. reclaiming gold from said sludge layer by further refining.

8. A process for recovering gold from gold ore bodies comprising the steps of:

a. culturing a bacteria of at least one bacterial species capable of producing cyanide ion in a solution under conditions wherein said species produces cyanide ion, and wherein said microorganism is at an approximate concentration of 10 mg/l to 10 g/l, thus forming a cyanide ion containing and producing culture;

b. pumping said culture solution into or upon a fractured milled or crushed ore body, said ore body containing gold in an amount of at least 0.02 oz/ton;

c. contacting said cyanide ion containing culture with gold ore, thereby causing production of gold ion-cyanide ion complexes and dissolution of gold from the gold ore;

d. removing, by biosorption and cyanide ion degradation, gold ion-cyanide ion complexes from solution to said culture thereby driving the gold dissolution reaction forward;

e. removing said culture from said ore body;

f. separating gold containing bacteria from said culture to form a sludge layer comprising said bacteria and an aqueous solution;

g. recycling said aqueous solution to the culture of step (a);

h. reclaiming gold from said sludge layer in high yield by further refining.

9. Method of any of claims 1, 2, or 7 above wherein said culture contains at least two microorganism species, the first of said species capable of producing cyanide ion and the second of said species capable of biosorping gold ion-cyanide ion complexes.

10. Method of any of claims 1, 2, or 7 above wherein said culture contains a microorganism species, said species capable of producing cyanide ion and of biosorping gold ion-cyanide ion complexes.

11. Method of claim 9 wherein said first and second species are selected from the group consisting of algae, bacteria and fungi.

12. Method of claim 10 wherein said species is selected from the group consisting of algae, bacteria and fungi.

13. Method of any of claims 3, 4, 5, 6 or 8 wherein said bacterial species is selected from the group consisting of Chromobacterium violaceum, Chromobacterium falvum, Bacillus pyocyaneus, Bacillus flourescens, Bacillus violaceus, bacillus megaterium, Bacillus mesentericus, Bacterium nitrificans, Pseudomonas aeruginosa, Pseudomonas flourescens, Pseudomonas aureofaciens, Pseudomonas cyanogena, Pseudomonas liquefaciens, Pseudomonas cepacia, Anacystis nidulans.

14. Method of any claims 3, 4, 5, 6 or 8 wherein said bacterial species is Chromobacterium violaceum.

15. Method of any claims 1, 2 or 7 wherein said microorganism is a fungi selected from the group consisting of basidomycete and ascomycetes.

16. Method of any claims 1, 2, or 7 wherein said microorganism is Marasmius oreades.

17. Method of any claims 1, 2, 3, 4, 5, 6, 7, or 8 wherein said culturing comprises the steps of:

a. inoculating a media with said species, said media containing a nitrogen source and a carbon source to form a culture;

b. maintaining said culture in an appropriate aerobic, anaerobic or photosynthetic environment until said culture reaches a density of at least 10 mg/l but no more than 10 g/l.

18. Method of any of claims 1, 2, 3, 4, 5, 6, 7, or 8 wherein said contacting is by a method selected from the group consisting of spraying a mass of broken ore, heap leaching, submersing a fragmented crushed or milled ore, and submersing a fragmented ore body in situ.

19. Method of any of claims 1, 2, 3, 4, 5, 6, 7, or 8 wherein production of cyanide ion by said species is maximized in the culture by at least one method selected from the group consisting of: culturing said species to an optimal growth phase, culturing said species to a cell density of at least 10 mg/l but not more than 10 g/l, and culturing said microorganism in the presence of an inducer for cyanide ion production.

20. Method of any of claims 1, 2, 3, 4, 5, 6, 7, or 8 wherein production of cyanide ion by said species is maximized in the culture by optimizing at least one of the culturing conditions selected from the group consisting of pH, temperature, light level, aeration rate, characteristics of growth vessel, carbon source, nitrogen source, metal ion concentration, salt concentration, phosphate concentration, and inducer concentration.

21. A process for recovering gold from carbonaceous gold ore bodies comprising the steps of:

a. culturing at least one microorganism species capable of degrading cyanide ion under conditions wherein said species degrades cyanide ion, thus forming a cyanide ion degrading culture;

b. combining said cyanide ion degrading culture with said carbonaceous gold ore, thereby forming an aqueous slurry;

c. treating said aqueous slurry with cyanide thereby causing production of gold ion-cyanide ion complexes and dissolution of gold from the ore;

d. removing, by biosorption and cyanide ion degradation, gold ion-cyanide ion complexes from solution to said culture thereby driving the gold dissolution reaction forward;

e. reclaiming biosorped gold from said culture by further refining.

22. A process for recovering gold from carbonaceous gold ore bodies comprising the steps of:

a. culturing at least one bacterial species capable of degrading cyanide ion under conditions wherein said species degrades cyanide ion, thus forming a cyanide ion degrading culture;

b. combining said cyanide ion degrading culture with said carbonaceous gold ore, thereby forming an aqueous slurry;

c. treating said aqueous slurry with cyanide thereby causing production of gold ion-cyanide ion complexes and dissolution of gold from the ore;

d. removing, by biosorption and cyanide ion degradation, gold ion-cyanide ion complexes from solution to said culture thereby driving the gold dissolution reaction forward;

e. reclaiming biosorped gold from said culture by further refining.

23. A process for recovering gold from carbonaceous gold ore bodies comprising the steps of:

a. culturing at least one fungal species capable of degrading cyanide ion under conditions wherein said species degrades cyanide ion, thus forming a cyanide ion degrading culture;

b. combining said cyanide ion degrading culture with said carbonaceous gold ore, thereby forming an aqueous slurry;

c. treating said aqueous slurry with cyanide thereby causing production of gold ion-cyanide ion complexes and dissolution of gold from the ore;

d. removing, by biosorption and cyanide ion degradation, gold ion-cyanide ion complexes from solution to said culture thereby driving the gold dissolution reaction forward;

e. reclaiming biosorped gold from said culture by further refining.

24. Method of claim 21 wherein said species is selected from the group consisting of algae, bacteria and fungi.

25. Method of any of claims 21 or 22 wherein said species is selected from the group consisting of *Bacillus subtilis* ATCC 21697 also known as *Achromobacter nitriloclastes*, *Corynebacterim sp.* ATCC 21698 also known as *Alcaligenes biscolactis*, *Rhodococcus rubropertictus* ATCC 21930 also known as *Nocardia Rubropertincta*, and *Pseudomonas paucimobilis* ATCC 39204.

26. Method of any of claims 21 or 23 wherein said species is selected from the group consisting of *Rhizopus Oryzae*, ATCC 62073 and *Stemphylium Loti*, ATCC 24601.

27. Method of any of claims 21, 22, or 23 wherein said species is obtained from a cyanide degrading waste water treatment facility.

28. Method of any of claims 21, 22, or 23 wherein said species is a species that degrades cyanide ion.

29. Method of any of claims 21, 22, or 23 wherein said biosorption is caused at pH 7-10.

30. Method of any of claims 21, 22, or 23 wherein said biosorption is caused at pH 8.5.

31. Method of any of claims 21, 22, or 23 wherein the gold ion in said gold ion-cyanide ion complex is the gold (I) ion.

32. A process for recovering gold from carbonaceous gold ore bodies comprising the steps of:

a. culturing at least one microorganism species;

b. combining said microorganism species with said carbonaceous gold ore, thereby forming an aqueous slurry;

c. treating said aqueous slurry with cyanide thereby causing production of gold ion-cyanide ion complexes and dissolution of gold from the ore;

d. removing, by biosorption and cyanide ion degradation, gold ion-cyanide ion complexes from solution to said culture thereby driving the gold dissolution reaction forward;

e. reclaiming biosorped gold from said culture by further refining.

* * * * *